United States Patent
Blum et al.

Patent Number: 6,165,632
Date of Patent: Dec. 26, 2000

[54] HIGH-TEMPERATURE FUEL CELL AND HIGH-TEMPERATURE FUEL CELL STACK

[75] Inventors: Ludger Blum, Erlangen; Robert Fleck, Adelsdorf; Thomas Jansing, Nürnberg, all of Germany

[73] Assignee: Siemens Aktiengesellschaft, Munich, Germany

[21] Appl. No.: 09/165,576

[22] Filed: Oct. 2, 1998

[30] Foreign Application Priority Data

Oct. 2, 1997 [EP] European Pat. Off. .............. 97117171

[51] Int. Cl.⁷ .................................................. H01M 8/00
[52] U.S. Cl. .............................. 429/12; 429/35; 429/30; 429/36
[58] Field of Search ..................... 429/12, 35, 30, 429/36

[56] References Cited

U.S. PATENT DOCUMENTS

| | | |
|---|---|---|
| 3,939,295 | 2/1976 | Robertson et al. . |
| 5,376,197 | 12/1994 | Schaupert . |
| 5,453,331 | 9/1995 | Bloom et al. . |

FOREIGN PATENT DOCUMENTS

| | | |
|---|---|---|
| 0562724A2 | 9/1993 | European Pat. Off. . |
| 06060891 | 4/1994 | European Pat. Off. ......... H01M 8/02 |
| 606579 | 7/1994 | European Pat. Off. ......... H01M 8/24 |
| 1542441 | 10/1968 | France . |
| 4334438A1 | 4/1995 | Germany . |
| 19608727C1 | 6/1997 | Germany . |
| 4097965 | 3/1992 | Japan .............................. B23K 1/19 |
| 06060891 | 3/1994 | Japan . |
| WO9733329 | 6/1997 | WIPO ............................ H01M 8/02 |

OTHER PUBLICATIONS

Published International Application No. 97/34331 (Jansing et al.), dated Sep. 18, 1997.

"Fuel Cell Handbook", A.J. Appleby et al., 1989, pp. 440–454.

*Primary Examiner*—Maria Nuzzolillo
*Assistant Examiner*—Angela J. Martin
*Attorney, Agent, or Firm*—Herbert L. Lerner; Laurence A. Greenberg; Werner H. Stemer

[57] ABSTRACT

In a high-temperature fuel cell having two components that are joined together by a layer. The layer includes at least one ply of a glass solder and at least one ply of a glass ceramic. Because of this provision, the components are joined together mechanically and chemically in a stable and economic manner.

20 Claims, 4 Drawing Sheets

HIGH-TEMPERATURE FUEL CELL AND HIGH-TEMPERATURE FUEL CELL STACK

BACKGROUND OF THE INVENTION

Field of the Invention

The invention relates to a high-temperature fuel cell and to a stack of high-temperature fuel cells.

It is known that in the electrolysis of water, the water molecules are decomposed by electric current into hydrogen ($H_2$) and oxygen ($O_2$). In a fuel cell, this process proceeds in reverse order. An electrochemical combination of hydrogen ($H_2$) and oxygen ($O_2$) into water produces electric current with high efficiency and, if pure hydrogen ($H_2$) is used as the gaseous fuel, without emitting pollutants and carbon dioxide ($CO_2$). Even with an industrial fuel gas, such as natural gas or coal gas, and air (which may additionally be enriched with oxygen ($O_2$)) instead of pure oxygen ($O_2$), a fuel cell generates markedly less pollution and less carbon dioxide ($CO_2$) than other energy producers that use fossil fuels. The industrial application of the principal of the fuel cell has led to various embodiments using different kinds of electrolytes and with operating temperatures between 80° C. and 1000° C.

Depending on their operating temperature, the fuel cells can classified as low-temperature, medium-temperature, and high-temperature fuel cells, which in turn are distinguished by different technical embodiments.

In the high-temperature fuel cell stack composed of many high-temperature fuel cells (in the professional literature, a fuel cell stack is also called a "stack"), below an upper composite printing circuit board that covers the high-temperature fuel cell stack, there are in order at least one guard layer, a contact layer, an electrolyte electrode unit, a further contact layer, a further composite printing circuit board, and so forth.

The electrolyte electrode unit includes two electrodes and a solid electrolyte, embodied as a membrane, disposed between the two electrodes. Each electrolyte electrode unit located between adjacent composite printing circuit boards, together with the contact layers immediately adjacent the electrolyte electrode unit, form one high-temperature fuel cell, which also includes the sides of each of the two composite printing circuit boards adjoining the contact layers. This type of fuel cell and other types are known for instance from the "Fuel Cell Handbook" by A. J. Appleby and F. R. Foulkes, 1989, pp. 440–454.

The components (such as the two metal composite printing circuit boards) of the high-temperature fuel cell are joined together for operation in subregions (the so-called joining regions; in the case of the composite printing circuit boards, for instance in the edge region). The term "joining" is understood to mean placement together in a fitting way or combining of work pieces or materials by various methods (such as screwing, riveting, welding, and so forth). Correspondingly, the parting (opening) between two work pieces (in this case components) to be joined is called a seam.

Various demands are made of the layer in the joining region that closes the seam between the components. The layer must have adequate gas-tightness. With a joining region disposed for instance in the peripheral region of the fuel cell (also called an outer joining region), it is thus assured that the fuel media, which in the fuel cell are in the gaseous state, cannot escape from the fuel cell to the environment. If the joining region is disposed in the interior of the fuel cell (internal joining region), then mixing of various fuel media (such as hydrogen ($H_2$) and oxygen ($O_2$)), is for instance prevented.

The layer must furthermore be invulnerable to an elevated pressure. The fuel media in the fuel cell will have an elevated pressure relative to the ambient atmosphere.

The layer must furthermore have adequate mechanical stability in the face of mechanical stresses that occur in the fuel cell. Temperature changes, for instance when a high-temperature fuel cell stack, which as a rule is composed of at least 40 fuel cells, is turned on and off, or changes in operating temperature (which depending on requirements can be between 600 and 1000° C.) exert considerable mechanical forces on the joining region. When the high-temperature fuel cell stack is assembled as well (or more precisely when the stack mechanically subsides), mechanical stresses cannot be avoided.

The material forming the layer in the outer joining regions should furthermore have added electrical insulation. An electrical short circuit between the components that are joined together by the layer must be avoided, because that would reduce the efficiency of the fuel cell. Electrochemical stability must exist, so that the slight electric current loss that nevertheless flows out via the layer will not destroy the material forming the layer and cause the layer to leak and allow gas to flow through.

The material forming the layer must furthermore be stable in the face of a chemical reaction with the fuel media inside the fuel cell. The fuel media in the fuel cell are in the form of reducing humid gasses, which can act chemically aggressively on the material of the layer. This can again cause leaks in the joining region of the fuel cell. Chemical compatibility with the material forming the components to be joined must be assured as well.

From International Patent Application WO 96/17394, layers for joining components of a high-temperature fuel cell are known that contain plies of a glass and plies of a ceramic. The plies of glass or ceramic are available in the form of prefabricated frames. Manufacturing the frames involves high cost, because the frames must be manufactured to high precision (in the $\mu$m range). In addition, assembling the various plies, because of the large number of fuel cells in a stack, requires considerable effort for adjustment and measurement. To obtain sufficiently stable glass frames, the glass is provided with additives (such as arsenic oxide ($As_2O_3$)). The additives can impair the quality of the joining region with regard to the properties required.

The ceramic frames are preferably produced by atmospheric plasma spraying or by vacuum plasma spraying. The frames produced in this way do not have adequate gas-tightness when used for relatively long times in the fuel cell.

SUMMARY OF THE INVENTION

It is accordingly an object of the invention to provide a high-temperature fuel cell and a high-temperature fuel cell stack which overcomes the above-mentioned disadvantages of the prior art devices of this general type, in which the fuel cell components are joined together in a mechanically and chemically stable yet economical way.

With the foregoing and other objects in view there is provided, in accordance with the invention, a high-temperature fuel cell, including: a first component; a second component; and a layer joining the first component to the second component, the layer having a ply of glass solder and a ply of glass ceramic.

In a high-temperature fuel cell with two components that are joined together in a joining region by a layer, the layer according to the invention includes at least one ply of the glass solder and at least one ply of the glass ceramic. The term "glass ceramic" (also known as vitro ceramic) designates polycrystalline solid bodies which are made by ceramicizing glass, that is, by controlled devitrification (crystallization) of the glass. A glass ceramic is created by heat treatment of a suitable glass in which crystals are thereby generated. The glass ceramic materials, like ceramic materials, still contain a certain proportion of glass phase along with the crystals. "Glass solder" (also known as solder glass) is a low melting glass with low viscosity and low surface tension, with a melting temperature between 400 and 700° C. A distinction is made between glass solders that can be thermally devitrified (crystallized) and glass solders that are relatively resistant to devitrification.

The layer that contains at least one glass solder and one glass ceramic is gas-tight. If the layer is used to join two components inside the fuel cell, that is, not in the peripheral region of the fuel cell, then two gas chambers with different gaseous fuel media are insulated from one another in a gas-tight fashion. If the layer is disposed in the outer region of the fuel cell, no fuel media from the fuel cell then reaches the atmosphere.

The layer has a high electrical insulation performance of several hundred kilo-ohms per $cm^2$. After more than 1000 hours in operation it is still chemically unchanged; that is, the material forming the layer has not undergone any chemical decomposition.

After a heat treatment of more than 1000 hours, the layer has substantially crystallized out. The glass ceramic ply has crystallized out completely, while the glass solder ply has crystallized out at least partially. Because of the high degree of crystallization of the layer, there is little interaction with the components to be joined, which for instance include a chromium-iron-based alloy, or zirconium oxide ($ZrO_2$). With respect to a chemical reaction with a fuel medium of the fuel cell (for instance with hydrogen ($H_2$) or oxygen ($O_2$)), as well, the plies of substantially crystallized-out materials are substantially more resistant than plies of non-crystallizing solders.

The substantially crystallized-out layer has higher viscosity than pure glass and is accordingly also substantially more press-resistant. In operation of the fuel cell, there is a pressure drop between the interior of the fuel cell and the ambient atmosphere. The fuel media of the fuel cell have an elevated pressure relative to the ambient atmosphere. The two-ply layer, because of the high degree of crystallization of the glass ceramic ply and the thin glass solder ply, is capable of withstanding the pressure exerted from the inside outward. In the layers known from the prior art for joining components of a fuel cell, the layer can be forced partway out of the fuel cell (in other words, blown out) by the resultant pressure. This causes the fuel cell to leak.

The glass solder does not crystallize until toward the end of the joining process (that is, upon curing at elevated temperature). During the joining process, the mechanical subsidence of a fuel cell stack can thus be adjusted in a defined way. Because of the residual viscosity (dictated by the residual glass phase, since the ply has not crystallized out completely), compensation of mechanical stresses and/or a reduction in stress within the stack is possible. In addition, the intermeshing of the crystallized-out plies of a glass solder and a glass ceramic produces high mechanical stability. By using a suitable composition of the materials (that is, of the glass solder and the glass ceramic), the coefficient of thermal longitudinal expansion can be adjusted in a defined way.

The layer may include one ply of a glass solder and one ply of a glass ceramic. This two-ply layer is the simplest to produce at the least financial expense, while still achieving all the aforementioned advantages.

In particular, the layer includes two plies of a glass solder and one ply of a glass ceramic, and the ply of glass ceramic is disposed between the two plies of glass solder. Since here two layers of glass solder are used, better performance with regard to the occurrence of mechanical stresses is obtained. The mechanical stresses are compensated for here or reduced by the two plies of glass solder. In the alternative, a single ply of glass solder can be sandwiched between two plies of glass ceramic.

In a further feature, the glass solder contains from 11 to 13 weight percent aluminum oxide ($Al_2O_3$), 10 to 14 weight percent boric oxide ($BO_2$), approximately 5 weight percent calcium oxide (CaO), 23 to 26 weight percent barium oxide (BaO), and approximately 50 weight percent silicone oxide ($SiO_2$). Preferably, the glass ceramic contains from 9 to 11 weight percent aluminum oxide ($Al_2O_3$), 11 to 13 weight percent boric oxide ($BO_2$), 22 to 23 weight percent barium oxide (BaO), approximately 45 weight percent silicone oxide ($SiO_2$), approximately 10 weight percent magnesium oxide (MgO) and approximately 1 weight percent titanium oxide ($TiO_2$). The compositions of material for the glass solder and the glass ceramic have proven themselves especially well in practice for joining together metal components that for instance include a chromium-based or iron-based alloy. The glass solder and the glass ceramic are also suitable for joining ceramic components. The coefficient of longitudinal expansion can be easily adapted by varying the proportions by weight to the materials of the components to be joined together. It may be advantageous to vary the chemical composition for different plies of glass solder, in order to achieve a graduated transition from one component to the next. The same is true for a plurality of layers of glass ceramic.

In particular, the components may be metal composite printing circuit boards or a composite printing circuit board and an electrolyte of an electrolyte electrode unit of the fuel cell.

According to the invention, a high-temperature fuel cell stack has a number of such high-temperature fuel cells.

In accordance with an added feature of the invention, the ply of glass solder is one of three plies of glass solder and the ply of glass ceramic is one of two plies of glass ceramic, and each of the two plies of glass ceramic is disposed between respective two plies of glass solder.

In accordance with an additional feature of the invention, each of the two plies of glass solder have different compositions.

In accordance with another feature of the invention, the three plies of glass solder include a first ply, a second ply and a third ply of glass solder, the second ply of glass solder disposed between the two plies of glass ceramic, and the second ply of glass solder has a different composition than the first ply and the third ply of glass solder.

In accordance with a further added feature of the invention, the first component and the second component define a seam formed between the first component and the second component, the seam having a width of between 100 and 800 µm and being substantially filled by the layer.

In accordance with a further additional feature of the invention, the ply of glass solder has a thickness of between 50 and 200 µm and the ply of glass ceramic has a thickness less than or equal to 400 µm.

In accordance with a concomitant feature of the invention, the first component and the second component each have a joining region and the layer is disposed between the joining region of the first component and the joining region of the second component.

Other features which are considered as characteristic for the invention are set forth in the appended claims.

Although the invention is illustrated and described herein as embodied in a high-temperature fuel cell and a high-temperature fuel cell stack, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
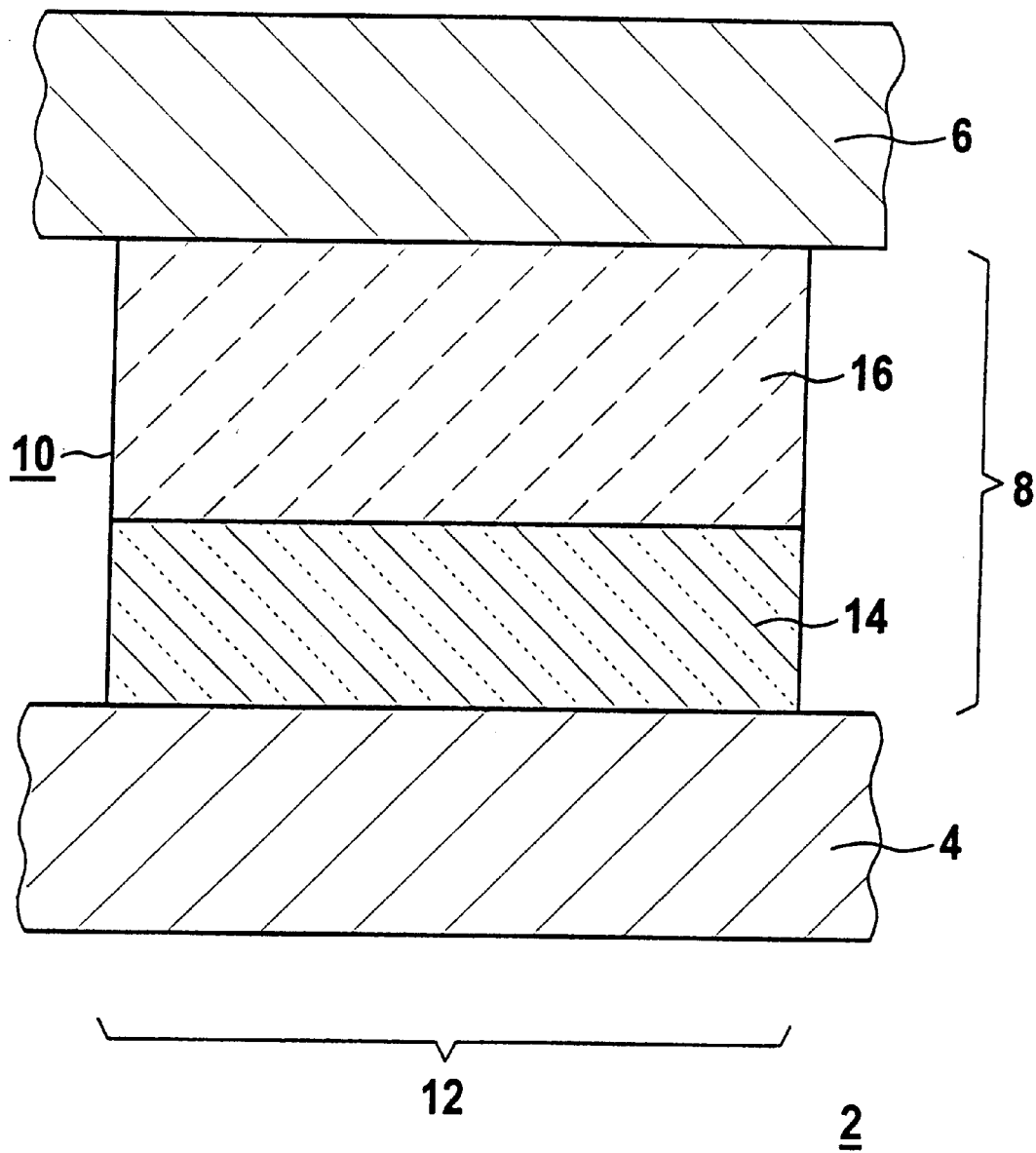
FIG. 1 is a fragmentary, sectional-view through a high-temperature fuel cell according to the invention.

Referring now to the figures of the drawing in detail and first, particularly, to FIG. 1 thereof, there is shown a high-temperature fuel cell 2 (fuel cell 2) with two components 4, 6. The components 4, 6 are either two metal composite printing circuit boards or one metal composite printing circuit board and an electrolyte of an electrolyte electrode unit of the fuel cell 2. The composite printing circuit boards 4, 6 of the fuel cell 2 as a rule contain a chromium-based alloy (that is, the material contains at least 50 weight % chromium (Cr)). A ceramic electrolyte of the fuel cell 2 contains zirconium oxide ($ZrO_2$), for instance.

In a seam 8 formed between the two components 4, 6, which defines the spacing between the two components 4, 6, there is a layer 10 that fills up the seam 8 (that is, the two components 4, 6 are joined to one another by the layer 10). The layer 10 extends across a joining region 12. The joining region 12, in the case of two composite printing circuit boards to be joined together, is disposed in the peripheral region of the composite printing circuit boards and thus of the fuel cell 2. The layer 10 seals off the interior of the fuel cell 2 from the outside atmosphere. If the two components 4, 6 are one composite printing circuit board and the electrolyte, then the joining region 12 is disposed in the interior of the fuel cell 2. In the embodiment, the layer 10 seals off two gas chambers, which contain two different fuel media of the fuel cell 2, from one another.

The layer 10 includes one ply 14 of a glass solder and one ply 16 of a glass ceramic. The glass solder ply 14 is disposed directly on the component 4. The remaining free space of the seam 8 between the two components 4, 6 is filled by the ply 16 of glass ceramic. That is, the glass ceramic ply 16 is disposed between the glass solder ply 14 and the component 6. The order of the two plies 14, 16 between the two components 4, 6 can equally well be reversed. The seam 8 as a rule has a width between 100 and 800 $\mu$m. If the joining region 12 is disposed in the interior of the fuel cell 2, the width of the seam 8 is as a rule less than when the joining region 12 is disposed in the peripheral region of the fuel cell 2. The glass solder ply 14 has a thickness between 50 and 200 $\mu$m, while conversely the glass ceramic ply 16 has a thickness between 50 and 600 $\mu$m. Thicknesses below 400 $\mu$m, however, are more advantageous for the glass ceramic ply 16.

The glass solder of the ply 14 contains from 11 to 13 weight percent aluminum oxide ($Al_2O_3$), 10 to 14 weight percent boric oxide ($BO_2$), approximately 5 weight percent calcium oxide (CaO), 23 to 26 weight percent barium oxide (BaO), and approximately 50 weight percent silicone oxide ($SiO_2$). The glass ceramic of the ply 16 conversely contains from 9 to 11 weight percent aluminum oxide ($Al_2O_3$), 11 to 13 weight percent boric oxide ($BO_2$), 22 to 23 weight percent barium oxide (BaO), approximately 45 weight percent silicone oxide ($SiO_2$), approximately 10 weight percent magnesium oxide (MgO) and approximately 1 weight percent titanium oxide ($TiO_2$). By the end of the joining process, the materials for the plies 14, 16 have largely crystallized out. The glass solder of the ply 14, however, still has a residual glass component, or in other words a viscous component. In principle, glass solders and glass ceramics that have largely crystallized out after the joining process are suitable as materials for the plies 14, 16.

The layer 14 of glass solder is applied for instance by wet powder spraying or screen printing and is then annealed at elevated temperature. Optionally, the ply 14 can be mechanically machined (reground or lapped). In addition, the mechanical treatment can be done before or after the annealing.

The glass ceramic ply 16 is applied by laying on a sheet, or by wet powder spraying or screen printing, and is then sintered at elevated temperature. In addition, the ply 16 can likewise optionally be mechanically treated.

The fuel cell 2 is especially well suited for installation in a stack of high-temperature fuel cells.

Figure 2:
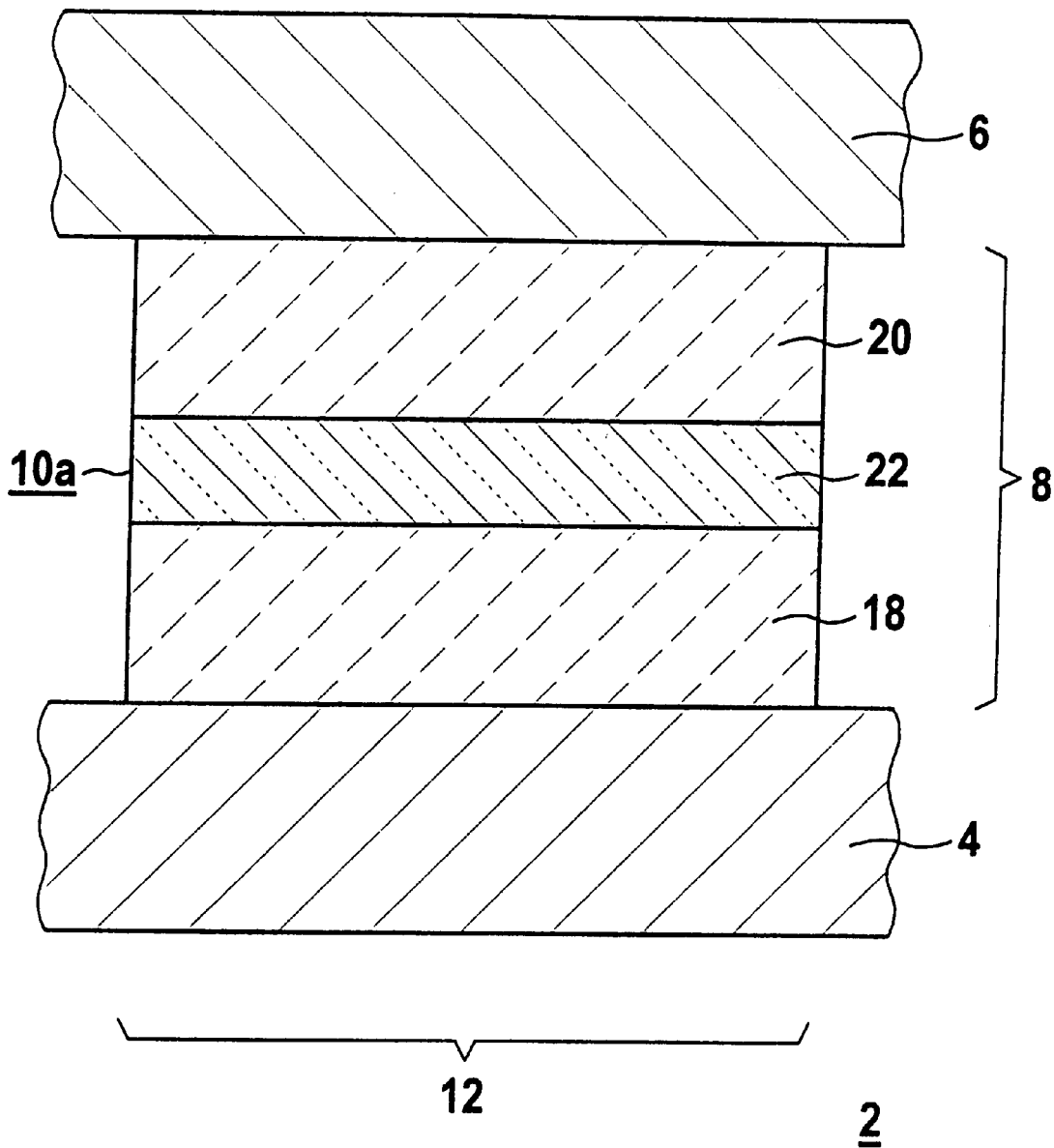
FIG. 2 is a fragmentary, sectional-view through a second embodiment of the high-temperature fuel cell.

As shown in FIG. 2, the layer 10a, which closes the seam 8 between the components 4, 6, includes two plies 18, 20 of the glass ceramic and one ply 22 of the glass solder. The ply 22 of glass solder is disposed between the two plies 18, 20 of glass ceramic. In this exemplary embodiment, the seam 8 is closed by a soldering process (that is, by soldering the ply 22 of a glass solder). The glass solder and the glass ceramic in this exemplary embodiment, as in the exemplary embodiments of FIGS. 3 and 4, each have a composition that has already been named in conjunction with the exemplary embodiments of FIG. 1.

Figure 3:
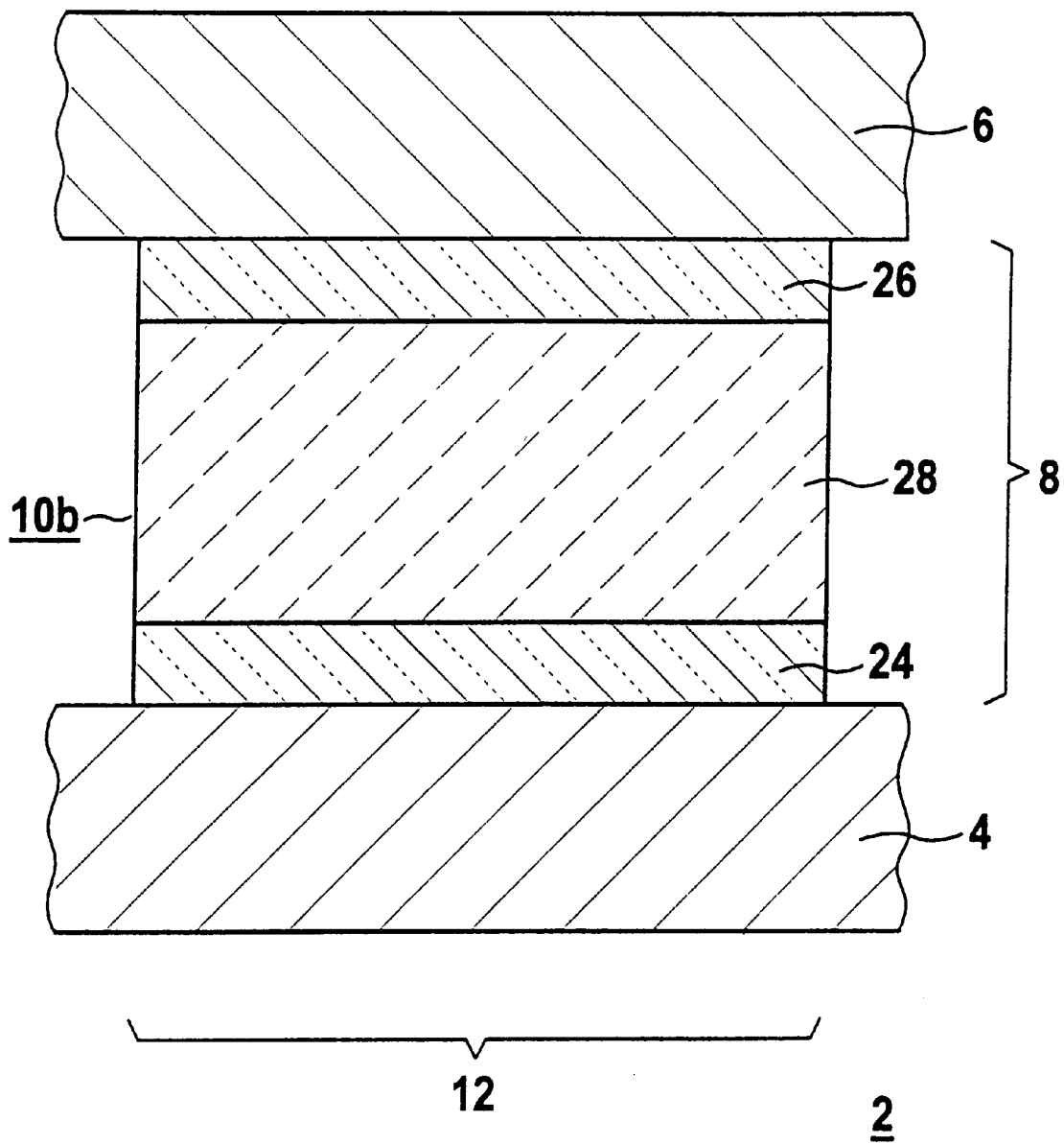
FIG. 3 is a fragmentary, sectional-view through a third embodiment of the high-temperature fuel cell.

In FIG. 3, the layer 10b includes two plies 24, 26 of the glass solder and one ply 28 of the glass ceramic, the latter being disposed between the two glass solder plies 24, 26. This embodiment has the advantage that two glass solder plies 24, 26 spatially separate from one another are available in order to meet the mechanical demands made of the fuel cell 2. For example, the weight of a stack itself is compensated for considerably better by the two plies than by one ply.

In particular (when at least two plies of glass solder and/or glass ceramic are used), different materials can be provided for the glass solder plies and/or for the glass ceramic plies. This makes it possible to meet different demands (mechanical or chemical) by using different plies.

Figure 4:
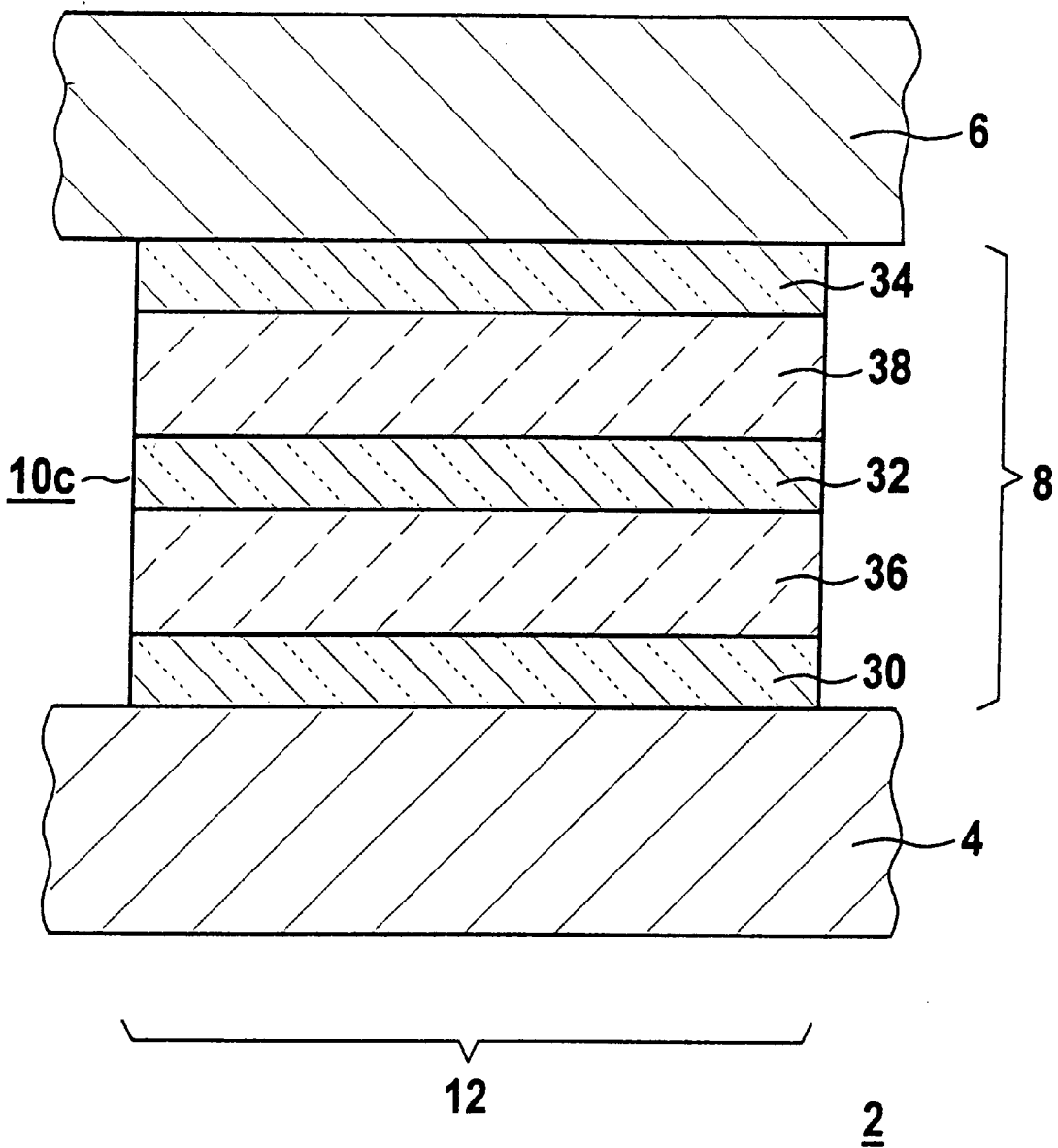
FIG. 4 is a fragmentary, sectional-view through a fourth embodiment of the high-temperature fuel cell.

In FIG. 4, the layer 10c includes three plies 30, 32, 34 of the glass solder and two plies 36, 38 of the glass ceramic.

The glass solder ply 30 is disposed over the component 4, and the glass solder ply 34 is disposed over the component 6. The glass ceramic ply 36 is disposed over the glass solder ply 30, and the glass ceramic ply 38 is disposed over the glass solder ply 34. The two glass ceramic plies 36, 38 are joined together by the glass solder ply 32. By using a plurality of glass solder plies 30, 32, 34 and a plurality of glass ceramic plies 36 and 38, the mechanical disposition of the fuel cell 2 (as well as of the stack of fuel cells) is more extensively stabilized.

A layer that includes plies of the glass solder and plies of the glass ceramic is fundamentally suitable for joining metal and ceramic components. That is, even outside a fuel cell, it can be used for other technical purposes.

We claim:

1. A high-temperature fuel cell, comprising:
   a first component;
   a second component; and
   a layer joining said first component to said second component, said layer having two plies of glass solder of different compositions and a ply of glass ceramic disposed between said two plies of glass solder.

2. A high-temperature fuel cell, comprising:
   a first component;
   a second component; and
   a layer joining said first component to said second component, said layer consisting of a ply of class solder and a ply of glass ceramic.

3. A high-temperature fuel cell, comprising:
   a first component;
   a second component; and
   layer joining said first component to said second component, said layer having a ply of glass solder and two plies of glass ceramic, and said ply of glass solder disposed between said two plies of glass ceramic.

4. The fuel cell according to claim 1, wherein said ply of glass solder is one of three plies of glass solder and said ply of glass ceramic is one of two plies of glass ceramic, and each of said two plies of glass ceramic is disposed between respective two plies of glass solder.

5. The fuel cell according to claim 1, wherein said ply of glass solder contains from 11 to 13 weight percent aluminum oxide ($Al_2O_3$), 10 to 14 weight percent boric oxide ($BO_2$), approximately 5 weight percent calcium oxide (CaO), 23 to 26 weight percent barium oxide (BaO), and approximately 50 weight percent silicone oxide ($SiO_2$).

6. The fuel cell according to claim 1, wherein said ply of glass ceramic contains from 9 to 11 weight percent aluminum oxide ($Al_2O_3$), 11 to 13 weight percent boric oxide ($BO_2$), 22 to 23 weight percent barium oxide (BaO), approximately 45 weight percent silicone oxide ($SiO_2$), approximately 10 weight percent magnesium oxide (MgO) and approximately 1 weight percent titanium oxide ($TiO_2$).

7. The fuel cell according to claim 4, wherein said three plies of glass solder include a first ply, a second ply and a third ply of glass solder, said second ply of glass solder disposed between said two plies of glass ceramic, and said second ply of glass solder has a different composition than said first ply and said third ply of glass solder.

8. The fuel cell according to claim 1, wherein said first component and said second component are metallic composite printed circuit boards.

9. The fuel cell according to claim 1, wherein one of said first component and said second component is a metal composite printing circuit board and the other is an electrolyte of an electrolyte-electrode unit.

10. The fuel cell according to claim 1, wherein said first component and said second component define a seam formed therebetween, said seam having a width of between 100 and 800 $\mu$m and being substantially filled by said layer.

11. The fuel cell according to claim 1, wherein said ply of glass solder has a thickness of between 50 and 200 $\mu$m.

12. The fuel cell according to claim 1, wherein said ply of glass ceramic has a thickness less than or equal to 400 $\mu$m.

13. The fuel cell according to claim 1, wherein said first component and said second component each have a joining region and said layer is disposed between said joining region of said first component and said joining region of said second component.

14. A high-temperature fuel cell stack, comprising:
   a plurality of high-temperature fuel cells each having:
   a first component;
   a second component; and
   a layer joining said first component to said second component, said layer having two plies of glass solder of different compositions and a ply of glass ceramic disposed between said two plies of glass solder.

15. The fuel cell according to claim 3, wherein said ply of glass solder contains from 11 to 13 weight percent aluminum oxide ($Al_2O_3$), 10 to 14 weight percent boric oxide ($BO_2$), approximately 5 weight percent calcium oxide (CaO), 23 to 26 weight percent barium oxide (BaO), and approximately 50 weight percent silicone oxide ($SiO_2$).

16. The fuel cell according to claim 3, wherein said ply of glass ceramic contains from 9 to 11 weight percent aluminum oxide ($Al_2O_3$), 11 to 13 weight percent boric oxide ($BO_2$), 22 to 23 weight percent barium oxide (BaO), approximately 45 weight percent silicone oxide ($SiO_2$), approximately 10 weight percent magnesium oxide (MgO) and approximately 1 weight percent titanium oxide ($TiO_2$).

17. The fuel cell according to claim 3, wherein said first component and said second component are metallic composite printed circuit boards.

18. The fuel cell according to claim 3, wherein one of said first component and said second component is a metal composite printing circuit board and the other is an electrolyte of an electrolyte-electrode unit.

19. The fuel cell according to claim 3, wherein said ply of glass solder has a thickness of between 50 and 200 $\mu$m.

20. The fuel cell according to claim 3, wherein said ply of glass ceramic has a thickness less than or equal to 400 $\mu$m.

* * * * *